US010069780B2

(12) United States Patent
Singh

(10) Patent No.: US 10,069,780 B2
(45) Date of Patent: Sep. 4, 2018

(54) METHODS AND SYSTEMS FOR STRUCTURING INFORMATION OF EMAIL MESSAGES

(71) Applicant: Rakesh Singh, Antioch, CA (US)

(72) Inventor: Rakesh Singh, Antioch, CA (US)

( * ) Notice: Subject to any disclaimer, the term of this patent is extended or adjusted under 35 U.S.C. 154(b) by 86 days.

(21) Appl. No.: 14/187,353

(22) Filed: Feb. 24, 2014

(65) Prior Publication Data

US 2014/0173011 A1 Jun. 19, 2014

Related U.S. Application Data

(60) Provisional application No. 61/771,097, filed on Mar. 1, 2013.

(51) Int. Cl.
*G06F 15/16* (2006.01)
*H04L 12/58* (2006.01)

(52) U.S. Cl.
CPC .............. *H04L 51/18* (2013.01); *H04L 51/02* (2013.01)

(58) Field of Classification Search
CPC ...................................................... H04L 51/18
See application file for complete search history.

(56) References Cited

U.S. PATENT DOCUMENTS

| | | | | |
|---|---|---|---|---|
| 5,931,905 A * | 8/1999 | Hashimoto | ............. | H04L 12/58 348/E5.099 |
| 7,616,971 B2 * | 11/2009 | Rouse | ................... | H04M 3/493 345/173 |
| 2006/0020670 A1 * | 1/2006 | Anderson | .............. | G06Q 10/10 709/206 |
| 2006/0248148 A1 * | 11/2006 | Timmins | .............. | G06Q 10/107 709/206 |
| 2007/0136255 A1 * | 6/2007 | Rizzo | .................. | G06F 17/3089 |
| 2007/0219863 A1 * | 9/2007 | Park | ....................... | G06Q 10/10 705/14.11 |
| 2008/0126353 A1 * | 5/2008 | Baude | .................. | G06Q 10/107 |
| 2009/0177751 A1 * | 7/2009 | Ito | ........................... | H04L 12/58 709/206 |
| 2011/0010182 A1 * | 1/2011 | Turski | .................. | G06Q 10/107 705/1.1 |
| 2011/0029616 A1 * | 2/2011 | Wang | .................... | G06Q 10/107 709/206 |
| 2011/0161182 A1 * | 6/2011 | Racco | ................ | G06Q 30/0277 705/14.73 |

* cited by examiner

*Primary Examiner* — Moustafa M Meky
*Assistant Examiner* — Sm Z Islam
(74) *Attorney, Agent, or Firm* — Georgiy L. Khayet

(57) ABSTRACT

Provided are computer implemented methods and systems for structuring information of email messages. An exemplary method comprises receiving an incoming email message. An automatic response is sent to a sender of the incoming email message with a request for information. The requested information is received from the sender and associated with a bin. The bin is structured according to a data model associated with the bin.

19 Claims, 11 Drawing Sheets

FIG. 4

METHODS AND SYSTEMS FOR STRUCTURING INFORMATION OF EMAIL MESSAGES

CROSS-REFERENCE TO RELATED APPLICATIONS

The present application claims the benefit of U.S. provisional application No. 61/771,097, filed on Mar. 1, 2013. The subject matter of the aforementioned application is incorporated herein by reference for all purposes.

FIELD

This application relates generally to email messaging and, more specifically, to methods and systems for structuring information of email messages using custom data models associated with collections of email messages.

BACKGROUND

Although there have been a lot of innovations in social networks, web searches, and other spheres, electronic mail (or email), which is the most widely used and oldest form of Internet communications, is still essentially the same.

Since the time email emerged, the range and volume of its use became much wider. Email is used to get notifications and updates from various applications for specific tasks, like bug tracking systems, customer support services, event organizing software, project management systems, applicant tracking software, and so forth. The recipient of these notifications and updates has to open and read an email message, then log on to the related application to get more details or make updates. This may be time consuming and tedious.

Another drawback of conventional email solutions is a large number of email messages and/or long messages that encumber retrieving required information.

Additionally, organizing and synchronizing email messages, documents, and information from various sources can also present difficulties.

Thus, the unstructured and verbose nature of email content makes it hard and laborious for humans to process messages (read, comprehend, and then take action). The time required to process emails manually grows exponentially with the number of emails, resulting in information overload, inefficiencies, productivity loss, human error, and missed opportunities.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are computer implemented methods and systems for structuring information of email messages. An example system for structuring information of email messages can enable a user to define one or more data models for emails associated with specific information. A data model can define the structure of information for an email. Additionally, the user can create one or more bins for one or more types of emails and associate data models having required information structures with the bins.

An incoming email addressed to a mailbox of the user can be processed to determine whether it is a reply to an existing conversation thread or not. If the message is the first email to a new conversation thread, the system for structuring information of email messages can send an auto-reply message with a web link. By clicking the link, the sender can access all the bins he is allowed to access. The sender can select a bin associated with his email and fill in a web form generated by the system. The web form can include input fields defined by the user. The form data, selected bin identifier, and unique identifier of the new email can be stored in the selected bin as structured data.

The structured information can be provided to the user upon a request as a spreadsheet, a chart, a graph, and so forth.

BRIEF DESCRIPTION OF THE DRAWINGS

Embodiments are illustrated by way of example and not limitation in the figures of the accompanying drawings, in which like references indicate similar elements and in which:

FIG. 4 is an example screen for defining a data model for a bin, in accordance with some example embodiments.

DETAILED DESCRIPTION

Figure 1:
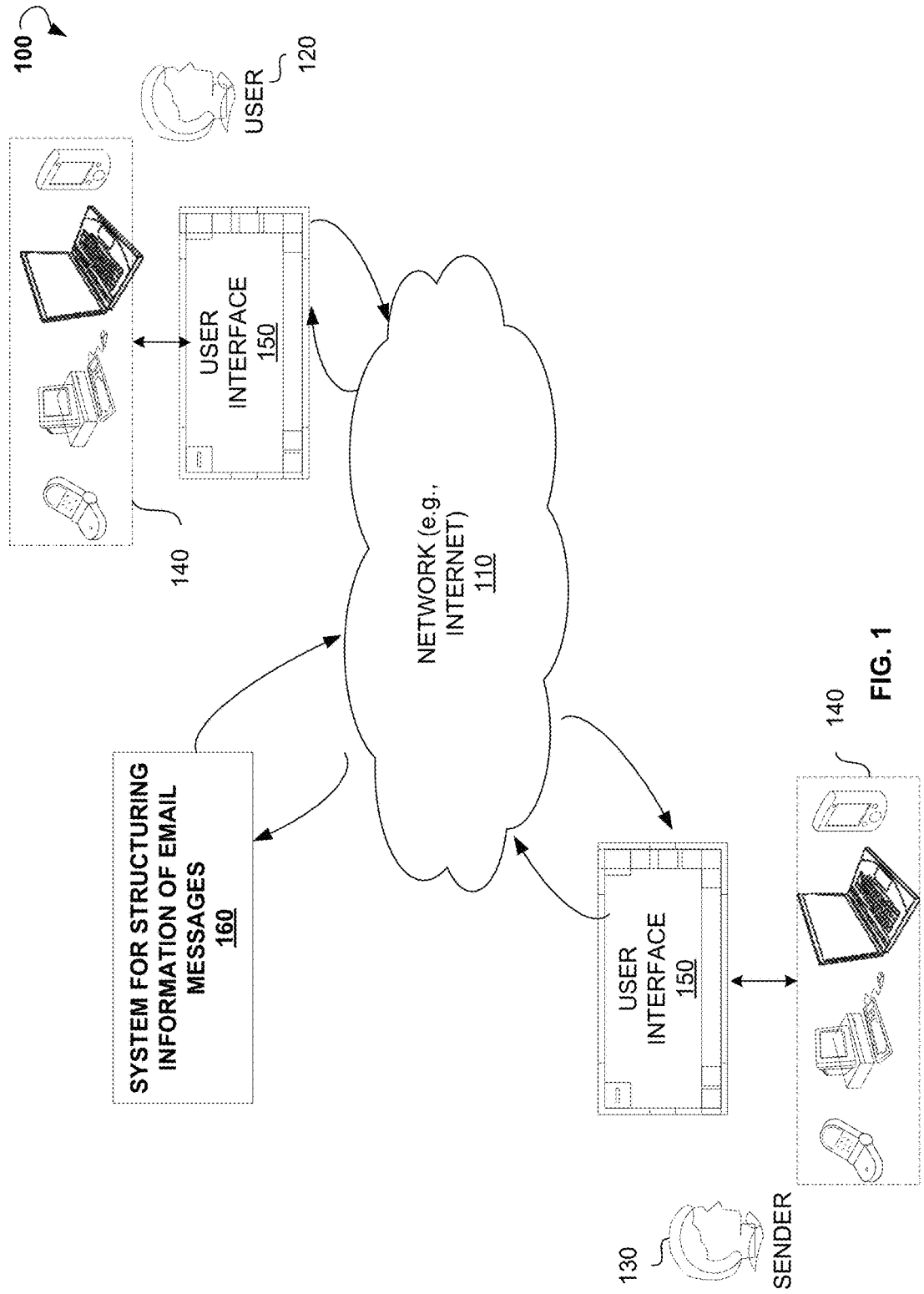
FIG. 1 is a block diagram illustrating an example environment within which a system for structuring information of email messages can be implemented.

Methods and systems for structuring information of email messages using custom data models associated with bins for email messages are described herein. A method for structuring information of email messages may provide an owner of an email box with structured information of his email messages.

A conventional email message comprises only 3 content fields: the subject, body, and attachments. Manually parsing unstructured information from the subject, body, and attachments is laborious and error prone. For example, an email user who posts an advertisement on craigslist to sell an iPhone can receive hundreds or thousands of email responses. The user will have to read each email to find the location of the buyer, his phone number, and offer price. To efficiently compare the received offers, the user will have to, for example, manually create a spreadsheet with three columns: location, phone number, and offer price. To reply to the selected potential buyers, the user will then have to find the emails from those buyers so he can email them back. If selling multiple items, this would require creating multiple spreadsheets. The problem would grow exponentially with more advertisements related to different items posted to different websites generating thousands of emails. The same problem exists in any use case where email is used, such as sales leads, hiring, customer support, project management, issue tracking, appointments, event management, and so forth.

People read the email text (subject, body, and attachments) to comprehend and extract key information. This can span into multiple email conversations (reading, writing and extracting) if the original email does not have all the information the user needs to take action. The user then either consumes the information directly or updates to a third party application (for example, a spreadsheet or other database), paper notes or devices (for example, a phone), or all of the above. For example, a sales person receiving email leads will read all emails to filter out junk leads, and then manually enter the lead information into a lead management system. A hiring manager will read all job inquiry emails, attached cover letters, and resumes to filter out unqualified candidates, and then follow up with the potential candidates.

To avoid such issues, some users require others to send them certain types of emails in a specific format (for example, sending error related emails with priority, build number, and module name in the body (on separate line) and an error keyword in the subject line). Though this approach makes it easy to spot error related emails, it requires familiarizing everyone with this convention. There is no way to enforce it, and the receiver still has to spend time processing such emails.

Some users apply different applications for different use cases, such as a customer relationship management system, issue tracking system, and so forth. This helps manage individual use cases, but does not resolve issues with emails, because these applications generate a large number of emails as well.

The proposed methods and systems extend unstructured email to structured email by allowing a user to define a custom data model and link it to an email type based on his use case. A user first creates smart bins for various types of email messages he receives or is going to receive, and then link a data model, defined by the user, to a corresponding bin. A data model may define the information structure inside the email. Every incoming email is stored with structured information along with the usual unstructured information (subject, body, and attachments).

For example, a user who posts an advertisement to sell his iPhone can define an "Offer" data model including a buyer location, a buyer email, a buyer phone number, and an offer price. When an email offer is received, it may be stored with structured information, location:xxx, phone number:xxx-xxx-xxxx, email:xxx@xxx.xxx, and offer price:$xxx, along with unstructured information: subject, body, and attachments (if any). The structured information can then be presented to the user in a spreadsheet, chart, graph, key value pair, and so forth. The structured information can be processed in a variety of ways.

A user can define as many data models as he wants (e.g., one to represent offers, another to represent mortgage leads, another to represent job applications, another to represent event attendees). Users may define various custom data models according to their needs.

Referring now to the drawings, FIG. 1 is a block diagram showing a sample environment 100 within which a system for structuring information of email messages is implemented, according to an example embodiment.

As shown in FIG. 1, the example network environment 100 may comprise a network 110 (for example, the Internet), a user 120, a sender 130, client devices 140, a user interface 150, and a system for structuring information of email messages 160.

The network 110 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking. The network 110 can be a network of data processing nodes that are interconnected for the purpose of data communication.

The client devices 140, in some exemplary embodiments, can include a Graphical User Interface (GUI) for displaying the user interface 150. In a typical GUI, instead of offering only text menus or requiring typed commands, the system presents graphical icons, visual indicators, or special graphical elements called widgets that can be utilized to allow the user 120 or the sender 130 to interact with the user interface 150. The client devices 140 can be configured to utilize icons used in conjunction with text, labels, or text navigation to fully represent the information and actions available to users.

The client devices 140 can include a desktop computer, laptop computer, tablet PC, cell phone, smart phone, or the like. The user 120 or the sender 130, in some exemplary embodiments, is a person or a robot interacting with the user interface 150 via the client devices 140. The user 120 can be a user of the system for structuring information of email messages 160. The user 120 can periodically interact with the system 160 to receive structured information from the system 160. The structured information may be stored in a system database and may include information provided by the sender 130.

Figure 2:
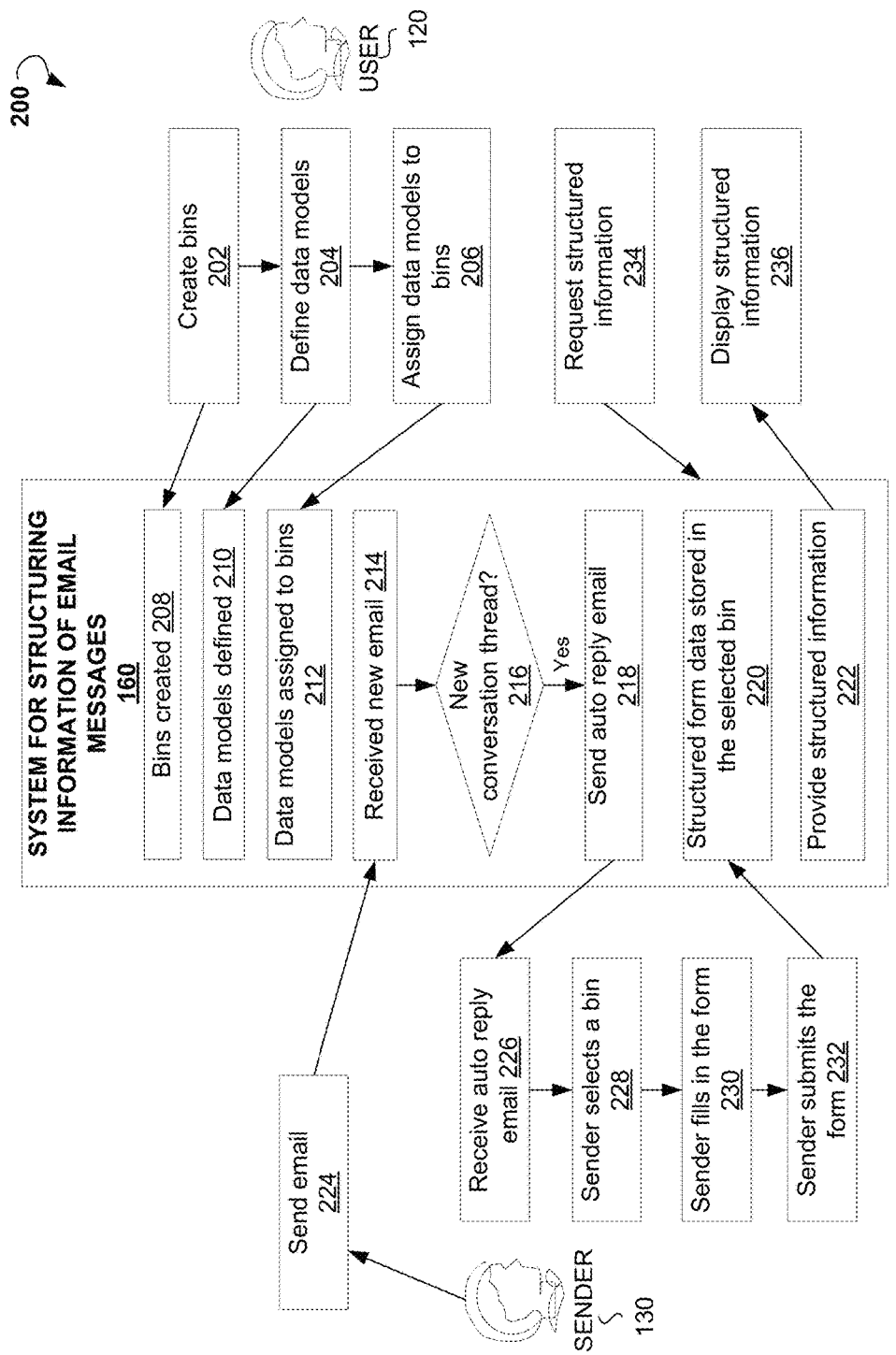
FIG. 2 shows example interactions of a user and a sender with the system for structuring information of email messages, in accordance with an example embodiment.

FIG. 2 shows example interactions 200 of a user 120 and a sender 130 with the system for structuring information of email messages 160. The user 120 may create one or more bins 202 (i.e., containers, folders) via a user interface. Each bin can be associated with a specific subject, for example, renting an apartment. The user can create bins for various subjects as he desires. Then, the user can define one or more data models 204. Defining a data model comprises specifying data fields to be provided to a sender to fill in and send a structured email message to the user 120. After the user creates a data model, he can assign the data model to a bin 206 with which he wants it associated. Thus, structured information from different senders will have the same structure and same data items, which allows presenting the structured information as a spreadsheet, a graph, and so forth.

Some bins have no data model assigned. In this case, no structured information is received and stored.

Upon request, the system for structuring information of email messages 160 creates bins 208, defines data models 210, and assigns data models to bins 212.

When the sender 130 sends an email 224 to the user 120, the system 160 receives a new email 214. Upon receiving the email message, a message ID associated with the email message such as an email ID or a thread ID can be extracted. The extracted message ID may be looked up in the system database to determine whether the email message is a reply to an existing conversation thread (message ID record exists) or is the first email of a new email thread 216 (no message ID record found in the database). Multiple message IDs may be extracted from one or more header fields, (e.g., references and in-replyto). The message ID may be associated with a header specific to an email service provider (e.g., Gmail, Yahoo, and Outlook).

If the message is a reply to an existing conversation thread, then it may be stored to the bin.

If the message is the first email to a new conversation thread 216, the system sends an auto reply email 218 to the sender 130 containing a web link with a unique identifier. Upon receiving the auto reply email 226, the sender 130 can click the web link, which opens a webpage with all the bins he is allowed to access. The sender can select a bin 228, which he considers related to a theme of his message, and click the selected bin. Based on the data model associated with the selected bin, a web form is generated by the system. The web form can include input fields as defined by the user 120. The generated web form is presented to the sender 130. The sender 130 can fill in the form 230 and submit it 232. The form data, selected bin identifier, and unique identifier of the web link are sent to the server associated with the system 160. The structured data is stored in the selected bin 220.

When the user 120 requests structured information 234, the system 160 provides the structured information 222 by displaying it via the user interface on a screen of a client device associated with the user.

Figure 3:
FIG. 3 is an example screen for creating a new bin, in accordance with some example embodiments.

FIG. 3 is a sample screen for creating a new bin. The user can specify a bin name 310 and description 320. Based on this data, the system generates a bin ID 330 used to uniquely identify the bin in the system for structuring information of email messages. The bin name 310 and description 320 can be shown to a sender when he selects a bin to which he assigns his message. The name 310 and/or description 320 explain the purpose of the bin and for what messages it is meant.

In some embodiments, the user optionally sets a password to access the bin. When the password is set, the sender may need to specify the password to access the bin. Thus, access to the bin is controlled, and undesirable activity is avoided.

Additionally, the user can optionally select to add CAPTCHA challenge to the bin. In this case, the sender, who wishes to access the bin, will need to enter a randomly generated CAPTCHA. If the entered CAPTCHA is correct, the sender gets access to the bin.

In some embodiments, the user may desire to create a bin without a data model assigned to the bin. When a sender selects such a bin, his message is saved to the bin, and the sender does not need to fill in any form in accordance to the data model. To create a bin without a data model, the user selects to add no form to the bin at the screen for creating a new bin.

Figure 4:
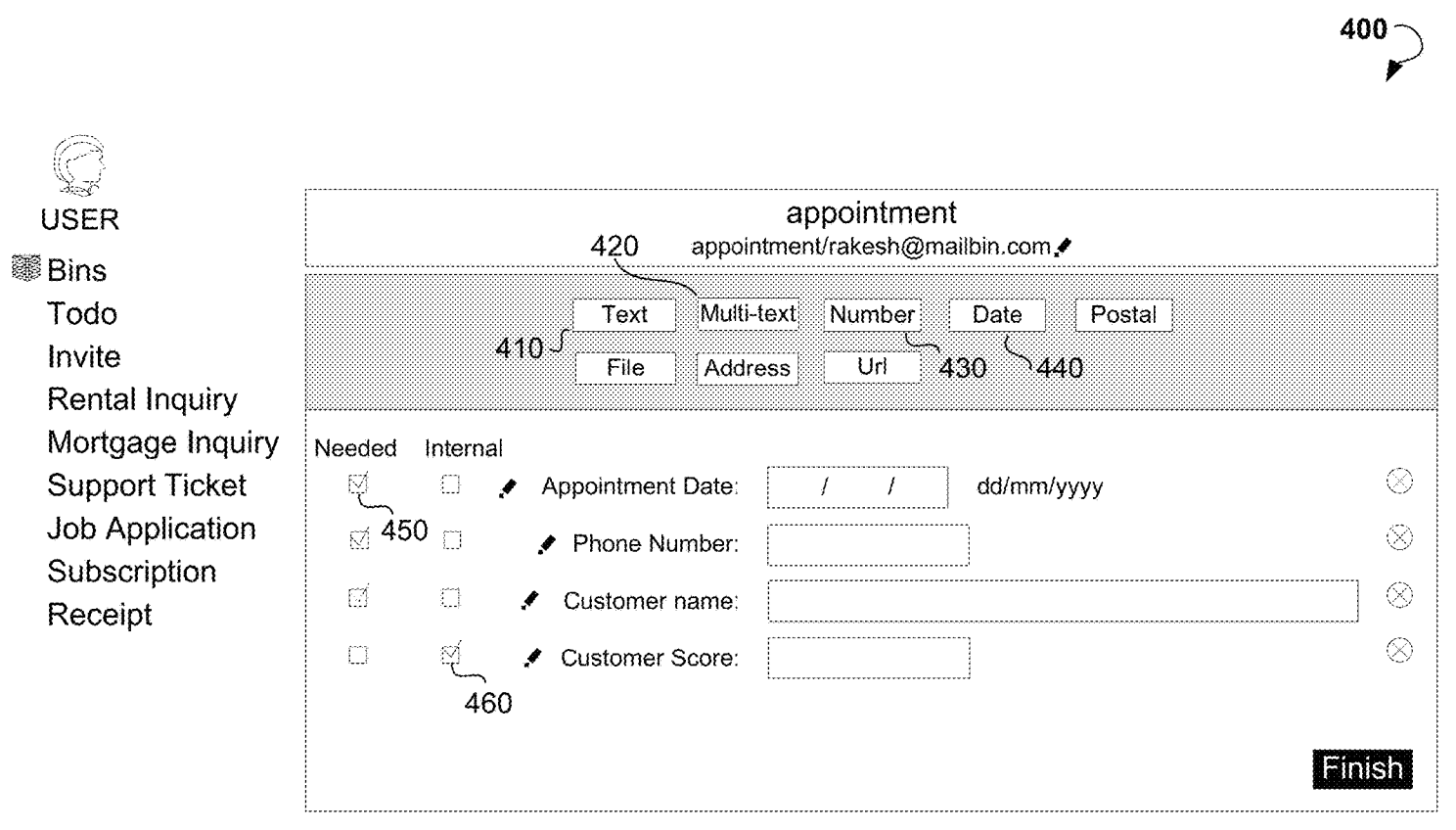

FIG. 4 is a sample screen 400 for defining a data model for a bin. Using screen 400, the user can compose a form, which the sender will fill in after selecting a bin. The user can add text 410, multi-text 420, number 430, date 440, or other fields to the form. The data model defined by the user may be as simple as a few fields or as complex as a complex hierarchical structure. The fields can be formatted accordingly and/or allow alphabetic or digital input only. Additionally, the user can select some fields to be obligatory for the sender to fill in, for example, by putting a tick mark 450 in the corresponding field. The sender will not be able to save his filled-in form without completing all obligatory fields.

The user can also mark some fields as internal 460. Internal fields will not be shown to the sender. Instead, the user fills in, edits, or deletes the internal fields. Moreover, some fields can be auto-populated by the system based on the data of the original message of the sender (e.g., email address of the sender).

In some embodiments, the user defines filter rules and predefined actions based on a data model. An action can be a plugin-based implementation to perform a well-defined task. An action can have access to a data model and structured information associated with an email message. For example, a user can create a filter rule to filter all applicants with grade point average (GPA)>3.5, automatically schedule a phone call with the hiring manager, and notify the hiring manager about it over the phone.

The original message from the sender can contains unstructured information in a text form. The reply message can contain a link, which may have a unique identifier and some explanation as to what action the sender should take. In some example embodiments, a sender accesses the profile page (e.g. http://mailbin.com/user) of a user directly in order to email the user. User profile page shows the list of publically accessible bins of the user. The sender can fill in the form and drop an email into the publically accessible bins. If the sender sends an email from the profile page of another user is also a user, the sender will not get an auto response to fill in the form.

The sender will not get an auto response email to fill in the form, but will need to provide his email address for verification purposes, along with other input. In response, the system for structuring information of email messages will send an email to verify sender's email address. The verification email can contain a unique link. The sender can follow this link to verify his email address. Alternatively, the verification email can contain a unique code which the sender can submit with the filled-in form.

Figure 5:
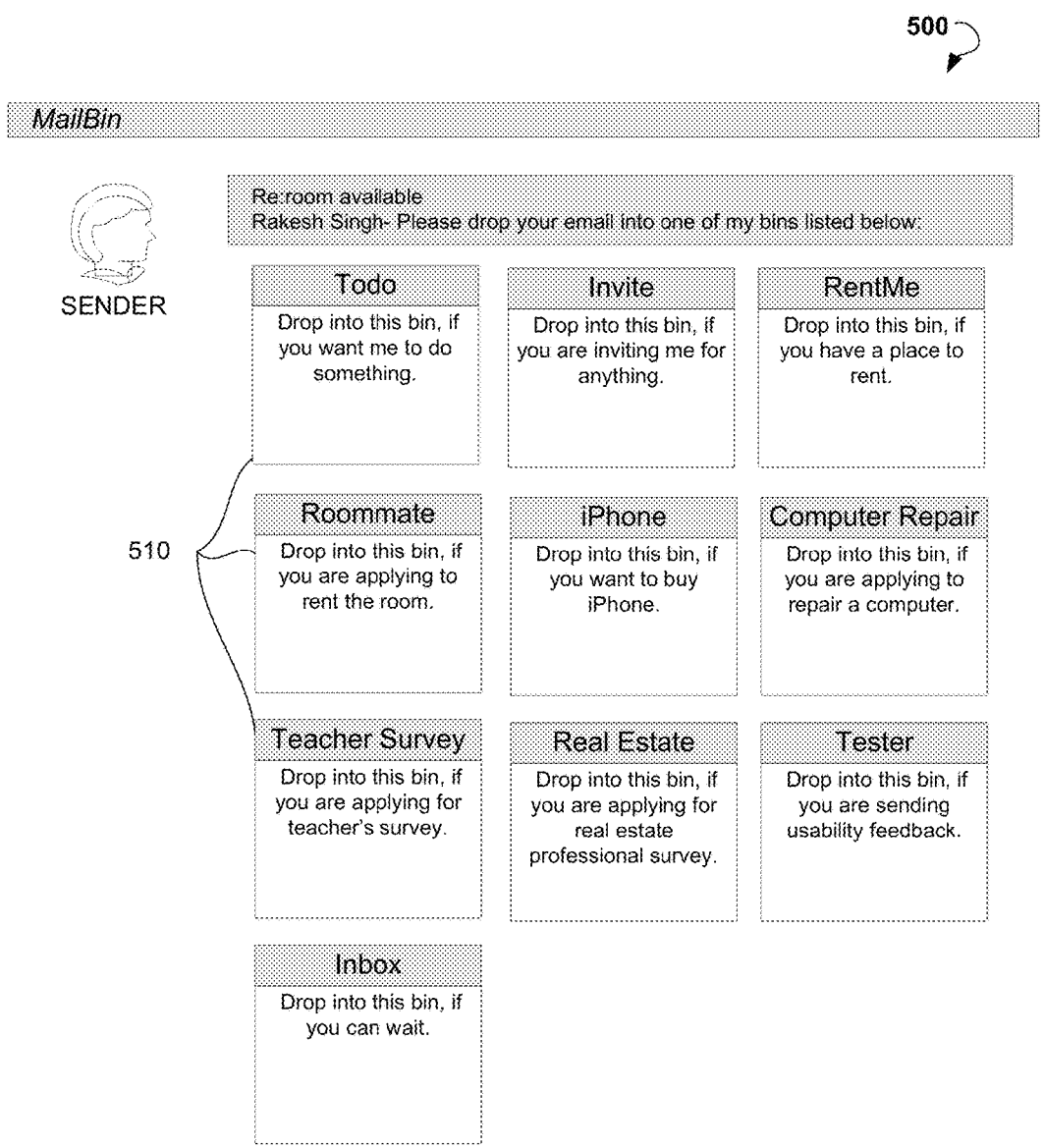
FIG. 5 shows an example screen displayed to a sender to select a bin, in accordance with some example embodiments.

By clicking on the link in the auto-reply message, the sender can view one or more bins of the user as shown by FIG. 5.

FIG. 5 shows a screen 500 of a user with bins 510 that a sender can access. The bins 510 can be shown together with their names and descriptions. The screen 500 can include names and descriptions of the bins 510 that the sender is authorized to view. Additionally, the screen may include instructions to the sender to select one of the bins to which the original message of the sender is related. A third party website can host a list of bins associated with a respective user or group of users.

The sender can select the bin 510 that corresponds to the subject of his message. For example, if the message of the sender relates to an apartment rental, the sender selects a bin named Rental. The sender can fill in the form and send an email to the user.

In some embodiments, the user manually composes a response message and sends it to the sender. The user can create an anonymous data model (not linked to any bin) and send a data submission request to the email sender. The user can send data submission requests to other messages in a conversation and/or send multiple data submission requests with different data models for one email message. If more than one person is involved in a conversation, the user can send data submission requests to all of them manually or automatically.

Additionally, the user can define auto response templates and delivery times to send responses to email messages automatically. For example, the user can set a rule to send an auto-response N seconds after receiving an original email message.

Furthermore, the user can set different auto-response rules based on access policies. A data request can be automatically repeated, if no structured information is submitted within a specified period of time. The specified period of time can be configured by the user.

In various embodiments, the user configures an auto-reply message to be sent via email, SMS, phone call, and/or third party application (Skype chat message, Facebook message, Twitter direct message, and so forth). For this purpose, the user can apply access policies.

A sender can submit structured information by clicking a web link or replying by email, SMS, phone call, or by third party application (Facebook, Twitter, and so forth) interfacing with the system for structuring information of email messages. If the sender clicks the web link to submit structured information, the forms presented to the sender can be one page or multi-pages, as defined by the user.

In some embodiments, the user includes bin selection and/or a form in an email message. In this case, the sender can sends structured information and bin selection as a part of the email text (the subject, body, and attachments) and/or custom headers. Alternatively, he can use a custom client, which captures structured information and bin selection from the email sender and sends to the system using API call.

In some embodiments, the user may configure which sender can access which bin by defining access policies and granting access rights. The user assigns access policies to senders, bins, or data models. Assignments can be made at an individual or group level. Additionally, the user can define access policies based on behavior of a sender. For example, the user can define a policy for all senders replying to a craigslist advertisement.

In some example embodiments, a user can define an access policy based on an email domain. For example, a user can show or hide bins if emails are received from a company domain (e.g. @company.com)

In some example embodiments, a user can manage bins by setting maximum in-process emails per bin. A sender can be notified if the bin is already full and not taking any more emails. Alternatively or additionally, the sender can be notified that there is a delay before the email is delivered to the receiver. Furthermore, the sender can be notified about a total number of emails in queue ahead of the sender's email.

In some example embodiments, the user is able to manage emails based on different criteria such as a number of pending emails, a user status or location (e.g., out of office), number of requests per person (sending more emails than allowed per person), priority, reaching high priority emails limit, and other criteria.

Using access policies, the user can hide from or show to a sender a bin or a set of bins. Thus, if a sender has no rights to view and/or access a bin, the bin is hidden for this sender. The user can apply more than one access policy to a sender, bin, and/or data model. In this case, the policy which has stricter rules is used.

Figure 6:
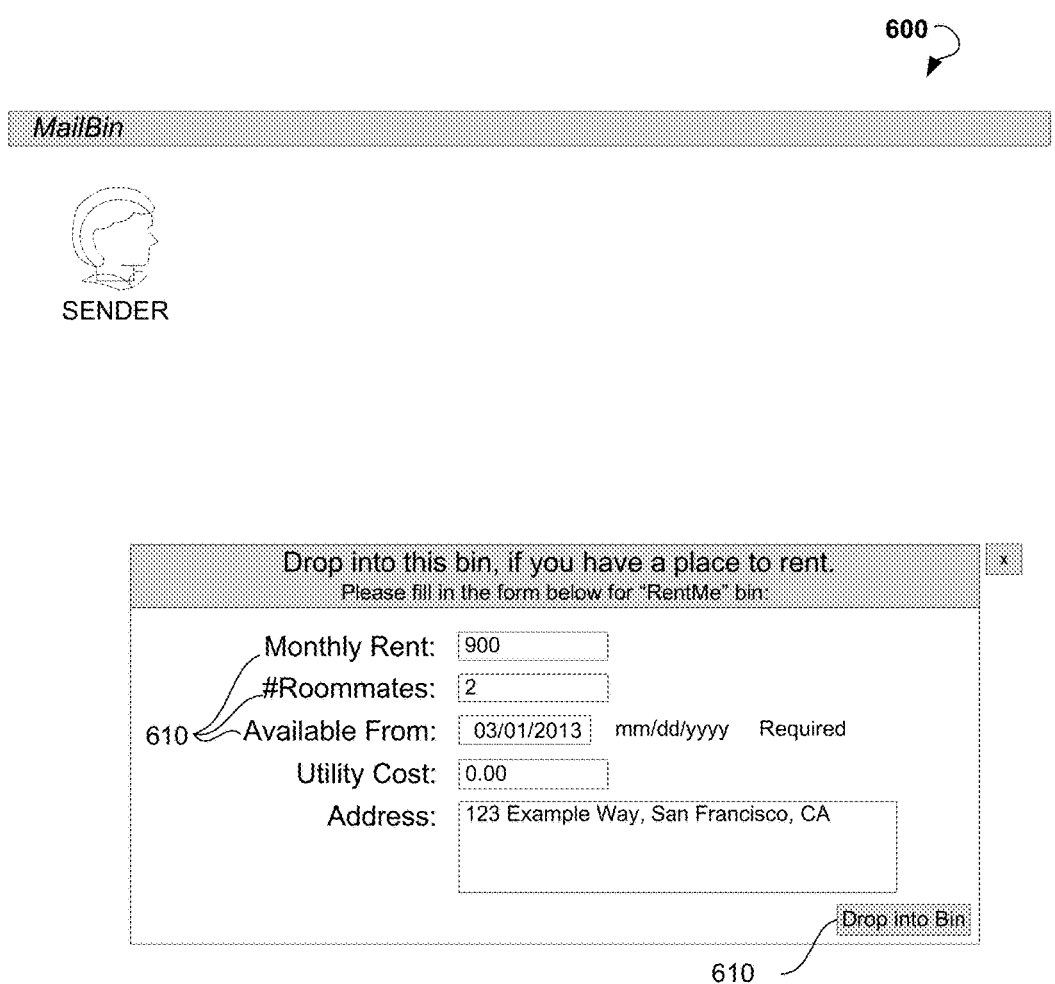
FIG. 6 illustrates an example form to be filled in by the sender, in accordance with some example embodiments.

When the sender selects a bin, a form associated with the selected bin is shown. The form to be filled in by the sender is illustrated in FIG. 6. The form 600 includes one or more data fields 610 as defined by the user in the data model associated with the bin. The sender can fill in the fields 610 in the form and give a command to save the filled in data and the original message in association with the selected bin, for example, by clicking Drop into Bin button 620.

Although the illustrated form 600 includes only one page, in various embodiments, the form can include multiple pages, as defined by the user.

After the form 600 is saved, the system for structuring information of email messages can display an informational message for the sender to confirm saving the filled-in data and the original message in the selected bin.

In some embodiments, the sender selects multiple bins with which to associate the email message.

The user can view the original message of the sender as it was sent, or he can see structured information as filled in by the sender in the form. The structured information can be shown as a spreadsheet, a chart, a graph, and so forth. The structured information of the sender may be shown together with structured information of other senders.

Furthermore, the user can reply to an email with structured data. The sender can send an email requesting structured reply by associating response data model with the email. The user receiving the email can read the email using an email client and click on the reply button that will show a form to be filled in. The user can fill in and submit the form. The email client can send the form data (structured data) to the server and the form data can be stored as structured data model in a database.

For example, the sender can send an email to a group of users with an invite for his birthday party, asking email receivers to reply with an RSVP, number of attendees, and meal choice. When an email receiver clicks on the reply button he can be shown a form with three input fields (RSVP, number of attendees, and meal choice).

The input form can be shown in a variety of ways depending on the specific implementation on the client. It should be understood that the input form can be of many shapes and forms.

In some example embodiments, the email sender can send an email with structured data. The email sender can fill in the form and send a structured email to a user. The structured email can be stored in the email receiver database as structured information.

For example, an email sender can send a party invitation email to a group of people. The email can contain structured information such as a location, time, description, and the like. The information can be stored in the email receiver database as structured data.

In some example embodiments, the user shares his bins with other users. The user can grant read/write access to the shared bins. This feature lets users share their bins, linked data models, and stages. However, email messages saved in the bins cannot be shared.

In some embodiments, the system for structuring information of email messages can include one or more system bins. The system bin can be accessible by multiple users. Email messages in the system bin are visible to every user who has access to the bin. To create a system bin, the user needs to have system administrator rights for the email domain. For example, only a system administrator for email-domain.com will be able to create system bins for emaildomain.com email users.

Figure 7:
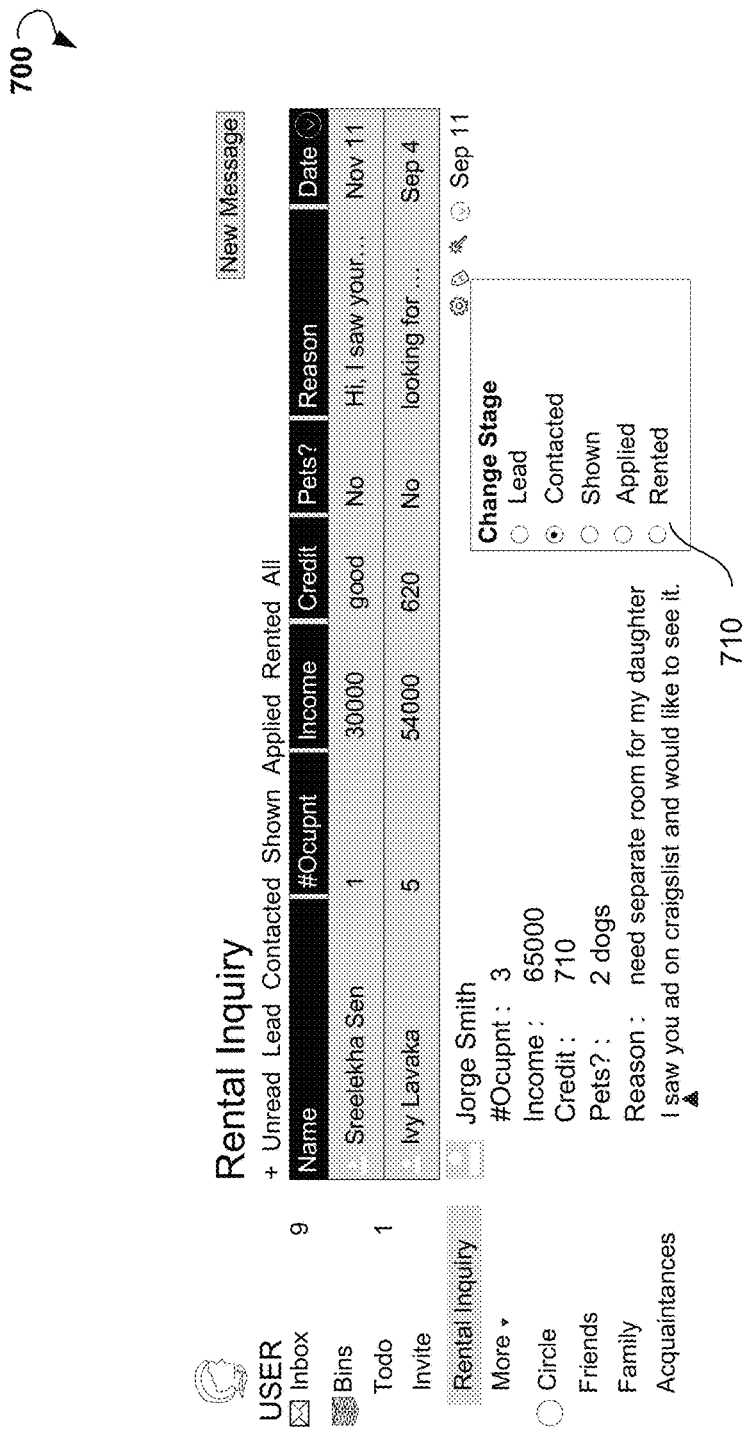
FIG. 7 illustrates custom stages of email messages per bin, in accordance with some example embodiments.

Conventionally, email messages can have the following stages: read and unread. Using the system for structuring information of email messages, the user can create custom stages of email messages per bin as shown by FIG. 7. For example, the user can define stages 710—Lead, Contacted, Shown, Applied, and Rented—for all emails placed into Rental Inquiry bin. At a given time, an email message can have only one custom stage per bin. The user can change a stage of an email message in a bin.

Any transition from one stage to another stage (previous/next) of an email message can be limited to a list of permitted stages. The user can define a list of permitted previous stages and a list of permitted next stages for each stage of an email message per bin. A user having access to the system/shared bin can automatically get access to its email stages.

In some embodiments, the system for structuring information of email messages is implemented to work with other direct electronic communication media used to share unstructured information (for example, direct messages on social networks (e.g., Facebook private messages, Twitter direct messages), corporate social networks (e.g. Yammer private messages), and so forth).

Figure 8:
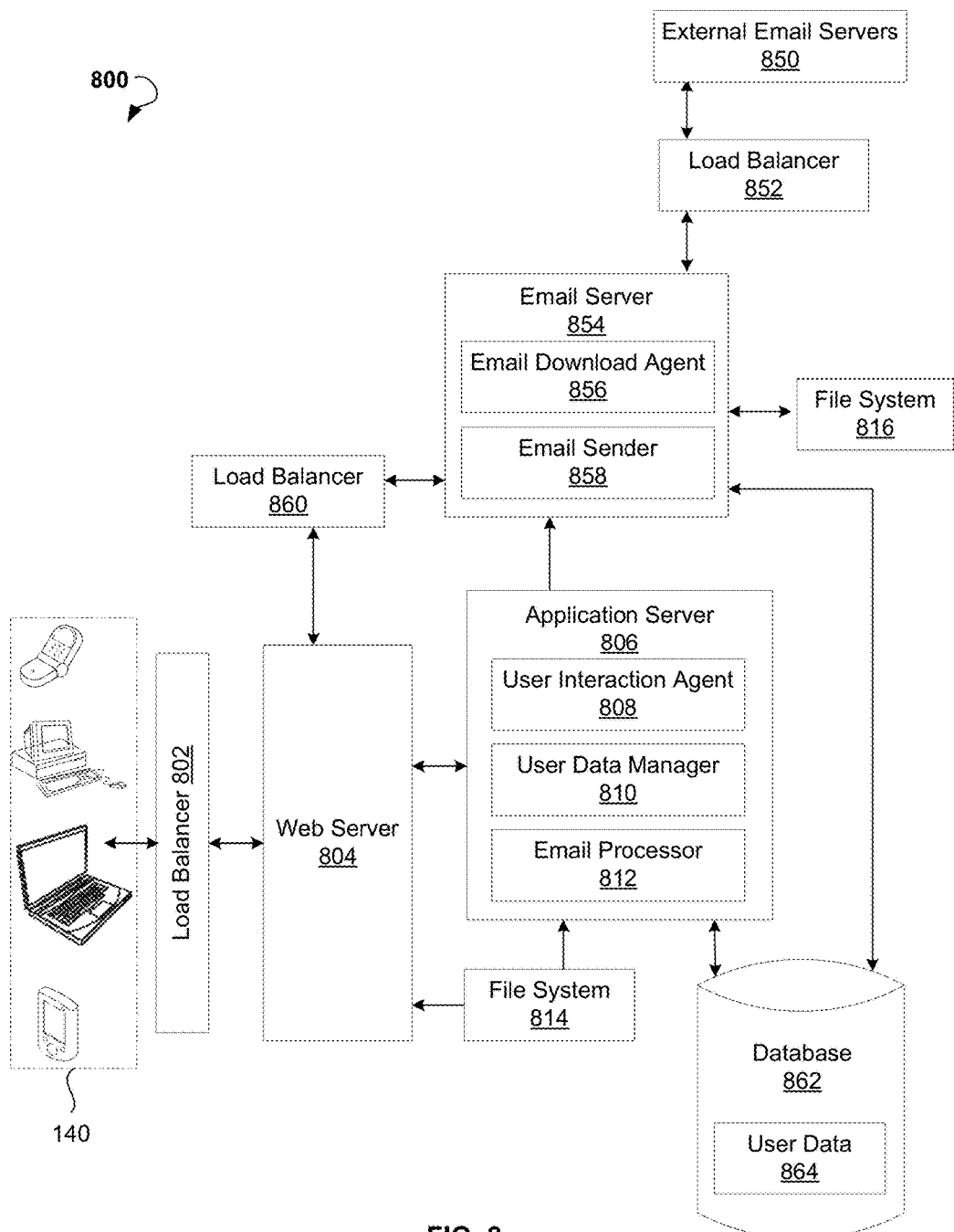
FIG. 8 shows an example embodiment of a system for structuring information associated with email messages, in accordance with some example embodiments.

FIG. 8 shows an example embodiment 800 of a system for structuring information associated with email messages. A user can access the system for structuring information of email messages via a client (downloadable Client and/or Browser), capable of performing action on behalf of the user, i.e. perform actions such as read/send emails, create bins, define data model, view structured information, configure auto-response templates, access control and policy, and so forth. A sender can also access the system for structuring information of email messages via a client (downloadable Client and/or Browser) to perform actions such as reply to the auto-response data requests (e.g. select a bin, fill in the form, unlock the password and/or captcha protected bins, send emails, and so forth). A request to perform an action can be routed, via a Web Server 804 through a load balancer 802, to the User Interaction Agent 808 residing on an Application Server 806 which can read and write to the database 862, send and/or receive a new email, return the response back via Web Server 804 to the client residing on a client device 140 associated with the user, and so forth. All incoming emails from third party email providers received from external email servers 850 through a load balancer 852 are downloaded by an Email Download Agent 856 residing on Email Server 854. The downloaded emails can be then sent to Email Processor 812, residing on an Application Server 806, to be processed and stored. In some embodiments, there can be an array Web Servers 804, an array of Application Servers 806, and/or an array of Email Servers 854. A load balancer 802 can be used to evenly distribute client requests between individual Web Servers 804. Another load balancer 852 can be used to distribute the load between individual Email Servers 854.

In some embodiments, Web Server 804, Application Server 806, and Email Server 854 can all reside on one physical server to reduce the server management complexity. The Application Server 806 and the Web Server 804 can communicate with a file system 814. The Email Server can communicate with a file system 816. To make the system fault tolerant to the Load Balancer failure, multiple Load Balancers can be used, e.g. load balancer 860.

In some embodiments, master and slave configuration of a Database 862 can be used to make database fault tolerant to the database failures.

A copy of the Database 862 can reside on a client host of the user to keep user data local in order to ensure privacy and safety of the data.

In some embodiments, all the modules relevant to a user including User Interaction Agent 808, User Data Manager 810, Email Processor 812, Email Download Agent 856, Email Sender 858, and Database 862 can reside on the client host computer. Backend modules can be needed only to transfer structured data from a sender client host computer to the user's client host computer.

Figure 9:
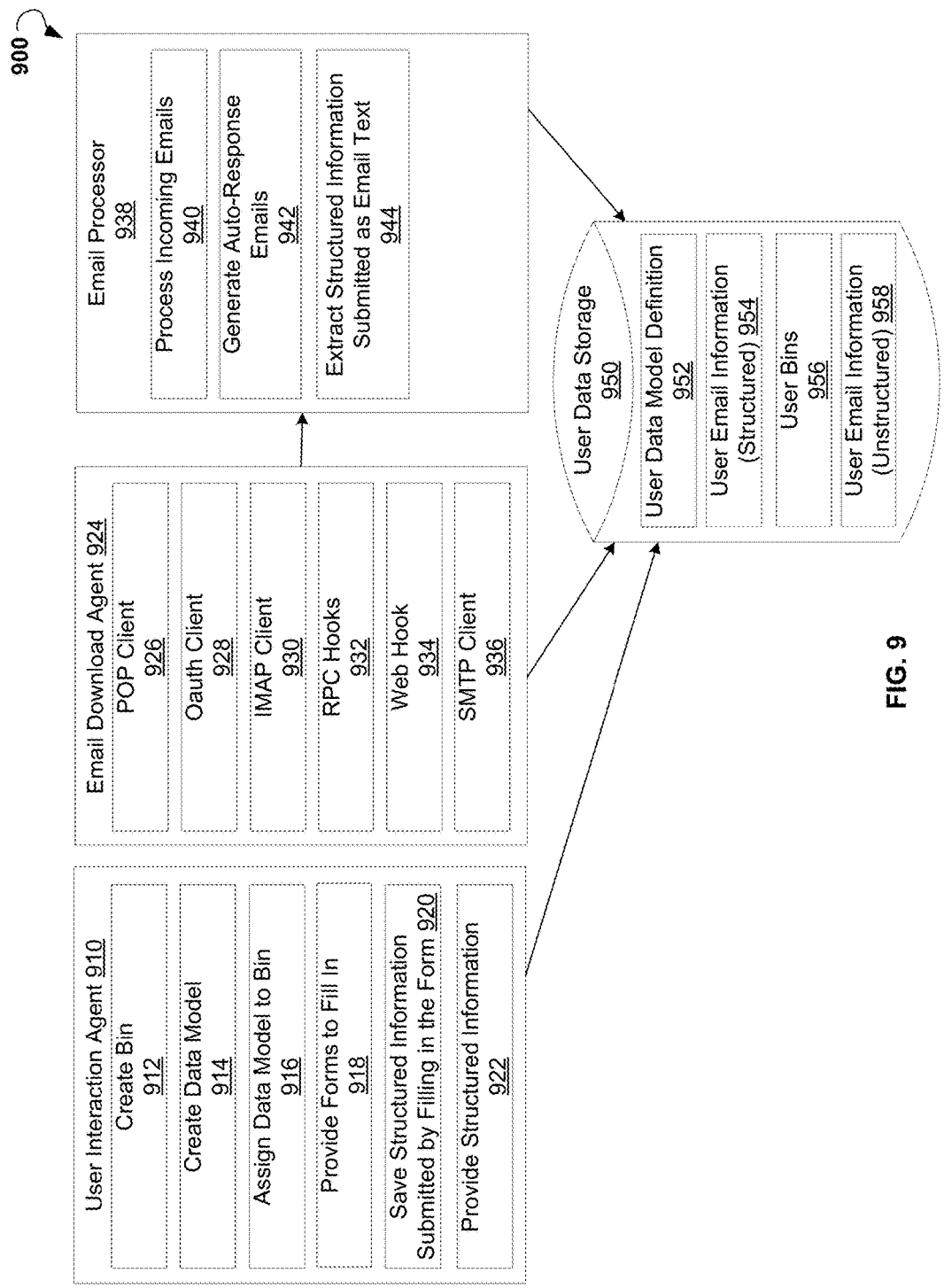
FIG. 9 is a representation of functions of a User Interaction Agent, Email Download Agent, Email Processor, and User Data Storage, in accordance to some example embodiments.

FIG. 9 is a representation 900 of functions of a User Interaction Agent 910, Email Download Agent 920, Email Processor 930, and User Data Storage 950, in accordance to some example embodiments. Those skilled in the art would understand that various modifications can be made to this example embodiment without departing from the scope and spirit of the present disclosure.

As shown in FIG. 9, the User Interaction Agent 910 can, upon user request and based on the information received from the user, create one or more bins 912, one or more data models 914, and assign a data model 916 to one or more bins.

Data associated with created user bins 956 and user data model definitions 952 as well as structured information of user emails 954 can be stored in the User Data Storage 950. When email messages are received from one or more senders, unstructured information 958 related to these messages can be also stored to User Data Storage 950.

Additionally, User Interaction Agent 910 can provide forms to the senders to fill in 918. The filled in forms can be processed to retrieve structured information, and then User Interaction Agent 910 saves structured information 920 to the User Data Storage 950. The saved structured information 954 is provided to the user upon request 922.

Incoming email communications can be performed by Email Download Agent 924 including such as, for example, POP Client 926, Oauth Client 928, IMAP Client 930, RPC Hooks 932, Web Hook 934, SMTP Client 936, and so forth. Outgoing email communications can be performed by Email Processor 938.

Email Processor 938 can process incoming email messages 940 from one or more senders. Processing includes extracting multiple messageIDs from the message and then determining whether at least one messageID is present in the User Data Storage 950. The messages that already have an ID present in the User Data Storage 950 can be stored to bins according to the ID. For messages without an ID presence in the User Data Storage 950, Email Processor 938 generates auto-response emails 942. Using an auto-response email, a sender can access available bins. Upon selecting a bin to save an email message, the sender can be provided with a fill-in form. If structured information is provided as an email reply in the form of text, then Email Processor 938 extracts structured information 944 from the email text and headers. The structured information is saved to the User Data Storage 950 as User Email Information (structured) 954.

Figure 10:
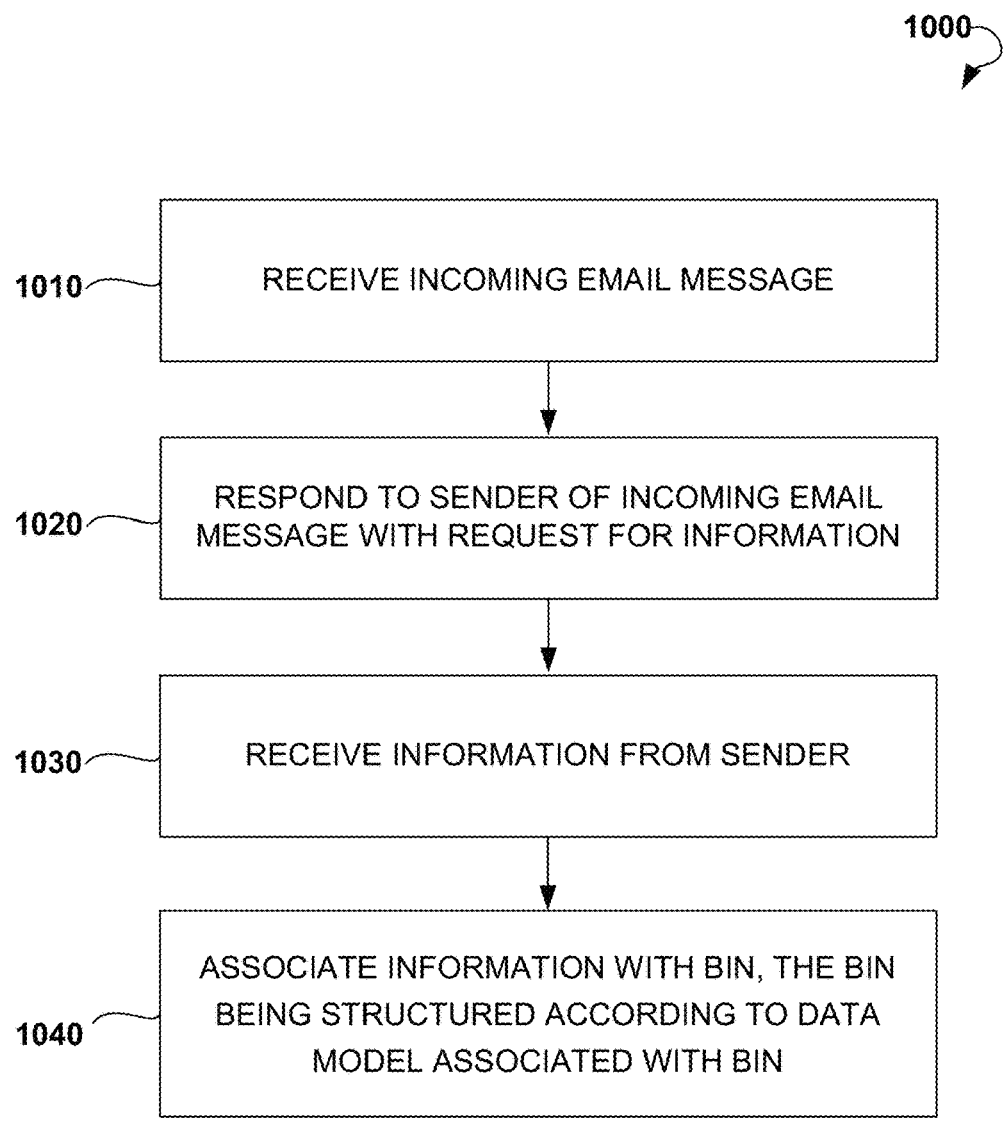
FIG. 10 is a flow chart illustrating a method for structuring information of email messages, in accordance with certain embodiments.

FIG. 10 is a flow chart illustrating a method 1000 for structuring information of email messages, in accordance with some example embodiments. The method 1000 may be performed by logic that comprises hardware (e.g., dedicated logic, programmable logic, and microcode), software (such as software run on a general-purpose computer system or a dedicated machine), or a combination of both. In one example embodiment, the processing logic resides at the system for structuring email messages, and the various elements of the system for structuring email messages can perform the method 1000. It will be appreciated by one of ordinary skill that examples of the foregoing modules may be virtual, and instructions said to be executed by a module may, in fact, be retrieved and executed by software. Although various elements may be configured to perform some or all of the various operations described herein, fewer or more elements may be provided and still fall within the scope of various embodiments.

As shown in FIG. 10, the method 1000 may commence at operation 1010 with receiving an incoming email message associated with a mailbox of a user. The incoming email message is processed to extract an email message ID. The extracted message ID is looked up in the system database. If the message ID record exists, the incoming email message is stored to the bin associated with the message ID record. If no message ID record found in the database, an auto reply email is generated and a response for information is sent as a response to the sender at operation 1020. The auto reply contains a web link to a webpage with all the bins the sender is allowed to access. The sender can select a bin on the webpage, which is related to a subject of his message, and the incoming message will be associated with the selected bin.

The bin can be associated with a data model. Based on the data model, a web form can be generated as defined by the user and provided to the sender. The sender can fill in and submit the form. Information including form data, selected bin identifier, and unique identifier of the email message can be received by the system for structuring information of email messages at operation 1030.

Based on the bin selection by the sender or the message ID, the information is associated with the bin at operation 1040. The information can be structured according to a data model defined by the user for the bin.

Figure 11:
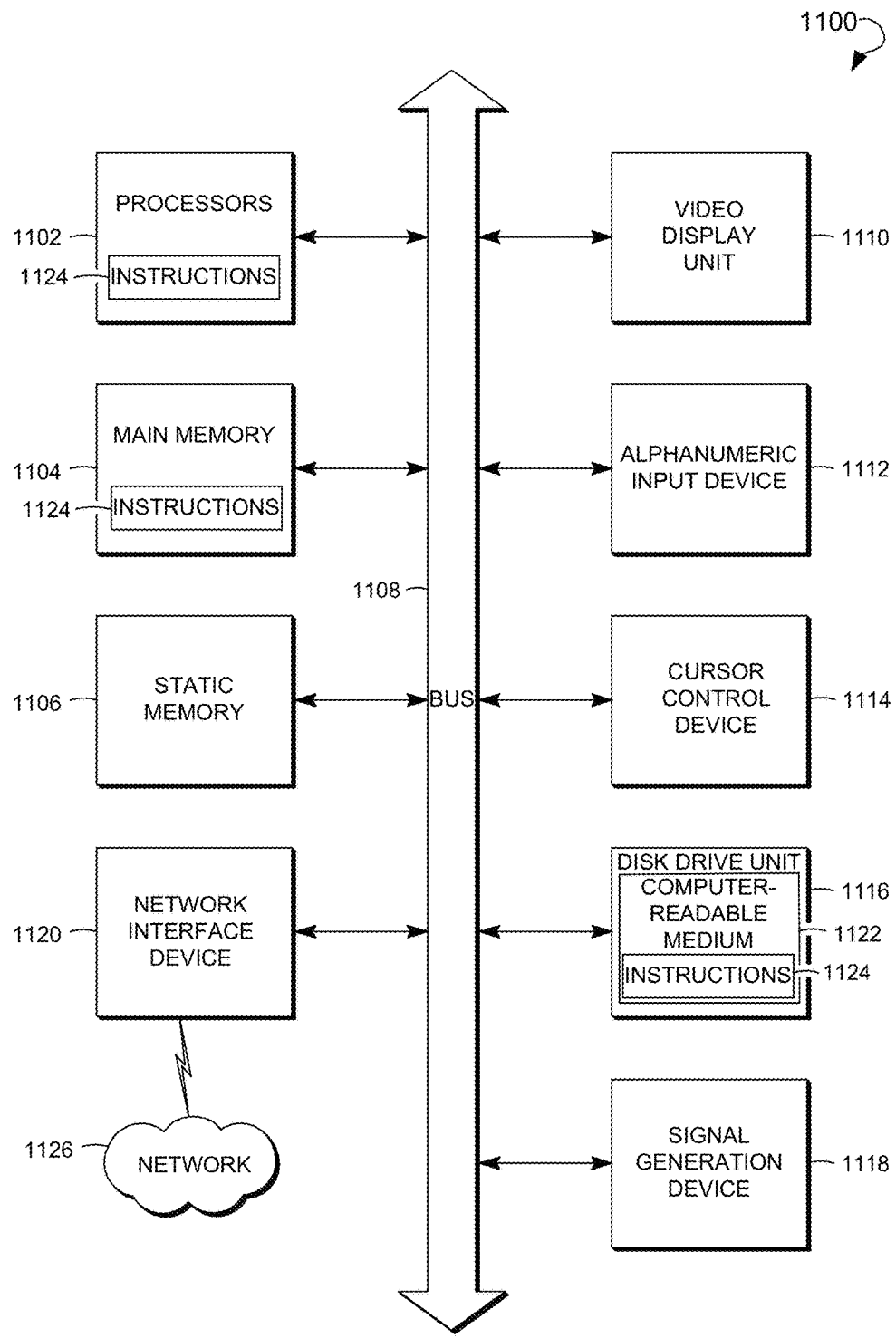
FIG. 11 shows a diagrammatic representation of a computing device for a machine in the exemplary electronic form of a computer system, within which a set of instructions for causing the machine to perform any one or more of the methodologies discussed herein can be executed.

FIG. 11 shows a diagrammatic representation of a computing device for a machine in the exemplary electronic form of a computer system 1100, within which a set of instructions for causing the machine to perform any one or more of the methodologies discussed herein can be executed. In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a cellular telephone, a digital camera, a portable music player (e.g., a portable hard drive audio device, such as an Moving Picture Experts Group Audio Layer 3 (MP3) player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor or multiple processors 1102, a hard disk drive 1104, a main memory 1106 and a static memory 1108, which communicate with each other via a bus 1110. The computer system 1100 may also include a network interface device 1112. The hard disk drive 1104 may include a computer-readable medium 1120, which stores one or more sets of instructions 1122 embodying or utilized by any one or more of the methodologies or functions described herein. The instructions 1122 can also reside, completely or at least partially, within the main memory 1106 and/or within the processors 1102 during execution thereof by the computer system 1100. The main memory 1106 and the processors 1102 also constitute machine-readable media.

While the computer-readable medium 1120 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, NAND or NOR flash memory, digital video disks, RAM, ROM, and the like.

The exemplary embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, C, C++, C# or other compilers, assemblers, interpreters or other computer languages or platforms.

Thus, various systems and methods for structuring information of email messages have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. A method for structuring information of email messages, the method comprising:
   receiving, by a processor, at least one outgoing email message sent, by a sender to a mailbox of a user;
   responding, by the processor, to the sender of the at least one outgoing email message, with a request for information, the request for information including at least a list of bins, each bin in the list of bins being associated with at least one subject of a list of subjects predefined by the user for email messages directed to the mailbox;
   receiving, by the processor, from the sender, a selection of a bin from the list of bins, the selection being made by the sender to match a subject of at least one outgoing email message of the sender and the at least one subject of the bin;
   based on the selection, associating, by the processor, the at least one outgoing email message with the bin selected by the sender, the bin being structured according to a data model associated with the bin;
   in response to the selection of the bin by the sender, providing, by the processor, a web form associated with the data model to the sender, the web form being predefined by the user of the mailbox for each bin of the list of bins and including one or more data fields to be filled in by the sender by providing information associated with the at least one outgoing email message, the one or more data fields including obligatory fields and non-obligatory fields, the obligatory fields and the non-obligatory fields being predefined in the web form by the user of the mailbox;
   receiving, by the processor, from the sender, the information associated with the at least one outgoing email message provided by the sender in the one or more data fields of the web form, the information associated with the at least one outgoing email message being filled in by the sender at least in each of the obligatory fields of the web form; and
   structuring, by the processor, the information associated with the at least one outgoing email message according to the data model associated with the bin.

2. The method of claim 1, wherein an input of the sender in the web form is received as the information.

3. The method of claim 1, wherein the information is structured according to the web form associated with the data model to provide structured information.

4. The method of claim 3, further comprising:
   receiving, from the user, a request for structured information; and
   based on the request for structured information, providing the structured information.

5. The method of claim 1, wherein the at least one outgoing email message is processed to extract an email identifier, the associating of the information with the bin being performed based on the email identifier.

6. The method of claim 1, further comprising:
   receiving, by the processor, from the sender, a structured incoming email message, wherein the structured incoming email message includes structured information provided by the sender; and
   storing the structured information to the database.

7. The method of claim 1, further comprising:
   receiving, by the processor, from the user, a command to send an outgoing email message, wherein the outgoing email message is associated with the data model;
   sending, by the processor, the outgoing email message to the sender;
   receiving, by the processor, a reply command from the sender;
   based on the reply command, providing to the sender, a form related to the data model associated with the outgoing email message; and
   receiving, by the processor, input to the form, the input being stored as structured information.

8. The method of claim 7, wherein the outgoing email message is sent to a group of receivers.

9. A system for structuring information of email messages, the system comprising:
   a processor configured to:
      receive at least one outgoing email message sent by a sender to a mailbox of a user;
      respond, to the sender of the at least one outgoing email message, with a request for information, the request for information including at least a list of bins, each bin in the list of bins being associated with at least one subject of a list of subjects predefined by the user for email messages directed to the mailbox;
      receive, from the sender, a selection of a bin from the list of bins the selection being made by the sender to match a subject of at least one outgoing email message of the sender and the at least one subject of the bin;
      based on the selection, associate, the at least one outgoing email message with the bin selected by the sender, the bin being structured according to a data model associated with the bin;
      in response to the selection of the bin by the sender, provide a web form associated with the data model to the sender, the web form being predefined by the user of the mailbox for each bin of the list of bins and including one or more data fields to be filled in by the sender by providing information associated with the at least one outgoing email message, the one or more data fields including obligatory fields and non-obligatory fields, the obligatory fields and the non-obligatory fields being predefined in the web form by the user of the mailbox;
      receive, from the sender, the information associated with the at least one outgoing email message provided by the sender in the one or more data fields of the web form, the information associated with the at least one outgoing email message being filled in by the sender at least in each of the obligatory fields of the web form; and
      structure the information associated with the at least one outgoing email message according to the data model associated with the bin; and
   a database communicatively coupled to the processor and configured to store at least the information, the bin, and the data model associated with the bin.

10. The system of claim 9, wherein the processor is further configured to:
    process the at least one outgoing email message; and
    generate an auto-response message.

11. The system of claim 10, wherein the auto-response message includes a link associated with one or more bins of the list of bins predefined by a user.

12. The system of claim 10, wherein the auto-response message includes the request for information.

13. The system of claim 9, wherein an input of the sender in the web form is received as the information.

14. The system of claim 9, wherein the information is structured according to the web form associated with the data model to provide structured information.

15. The system of claim 14, wherein the processor is further configured to:
- receive, from the user, a request for structured information; and
- based on the request for structured information, provide the structured information.

16. The system of claim 15, wherein the structured information is provided as one or more of the following: a spreadsheet, a chart, and a graph.

17. The system of claim 9, wherein the list of bins includes one or more bins for selection of the sender.

18. The system of claim 9, wherein the user defines one or more stages for the email messages, the one or more stages being associated with the bin.

19. A non-transitory computer-readable medium comprising instructions, which when executed by one or more processors, perform the following operations:
- receive at least one outgoing email message sent by a sender to a mailbox of a user;
- respond to a sender of the at least one outgoing email message, with a request for information, the request for information including at least a list of bins, each bin in the list of bins being associated with at least one subject of a list of subjects predefined by the user for email messages directed to the mailbox;
- receive, from the sender, the selection being made by the sender to match a subject of at least one outgoing email message of the sender and the at least one subject of the bin;
- based on the selection, associate the at least one outgoing email message with the bin selected by the sender, the bin being structured according to a data model associated with the bin;
- in response to the selection of the bin by the sender, provide a web form associated with the data model to the sender, the web form being predefined by the user of the mailbox for each bin of the list of bins and including one or more data fields to be filled in by the sender by providing information associated with the at least one outgoing email message, the one or more data fields including obligatory fields and non-obligatory fields, the obligatory fields and the non-obligatory fields being predefined in the web form by the user of the mailbox;
- receive, from the sender, the information associated with the at least one outgoing email message provided by the sender in the one or more data fields of the web form, the information associated with the at least one outgoing email message being filled in by the sender at least in each of the obligatory fields of the web form; and
- structure the information associated with the at least one outgoing email message according to the data model associated with the bin.

* * * * *